United States Patent [19]

Nagaura

[11] Patent Number: 5,722,345

[45] Date of Patent: Mar. 3, 1998

[54] METHOD AND APPARATUS FOR TRANSPORTING LIVE FISH

[76] Inventor: Yoshiaki Nagaura, 585-61, Ohaza-Futsukaichi, Chikushino, Japan

[21] Appl. No.: 544,954

[22] Filed: Oct. 18, 1995

Related U.S. Application Data

[62] Division of Ser. No. 130,402, Oct. 1, 1993, Pat. No. 5,463,983.

[30] Foreign Application Priority Data

Oct. 6, 1992 [JP] Japan .................. 4-319183
Oct. 6, 1992 [JP] Japan .................. 4-319184

[51] Int. Cl.$^6$ .................................. A01K 63/02
[52] U.S. Cl. .................................. 119/203
[58] Field of Search .................... 119/201, 203; 43/55; 383/103, 106

[56] References Cited

U.S. PATENT DOCUMENTS 2,949,882  8/1960  Thomas, Jr. ............... 119/203
4,498,190  2/1985  Gralick III ............... 119/201 X

FOREIGN PATENT DOCUMENTS 3133747  6/1991  Japan ....................... 119/203
3139230  6/1991  Japan ....................... 119/203

*Primary Examiner*—Robert P. Swiatek
*Attorney, Agent, or Firm*—Jordan & Hamburg

[57] ABSTRACT

A method transporting live fish including shellfish for a long period of time and with less damage to the fish bodies includes immobilizing the fish prior to transportation. One electrode is provided at the head portion of the fish, and another electrode is provided at the tail portion of the fish, whereby a current is allowed to flow between the electrodes to place the fish in an anesthetized condition, after which the spinal cord of the fish is cut. By this method, the live fish are immobilized. Then, only the fish are inserted through a fish insertion opening of a bag for transporting the fish, wherein at the upper portion of the bag formed of a material having water resistance and being thermally fused is formed, integral with the material, a web-like pouring tube for liquid with air or oxygen. Water or sea water with air or oxygen is poured through the pouring tube and after this, the extreme end of the pouring tube is thermally fused to seal the interior of the bag, in which state the fish are transported.

16 Claims, 16 Drawing Sheets

1

METHOD AND APPARATUS FOR TRANSPORTING LIVE FISH

This is a division of application Ser. No. 08/130,402, filed Oct. 1, 1993 now U.S. Pat. No. 5,463,983.

BACKGROUND OF THE INVENTION

1. Field of the Invention

The present invention relates to a method and apparatus for transporting fish that have been freshly caught or fish that have been cultivated in their living state to markets, restaurants, consumers and the like. Throughout this specification and claims, "fish" refers to all commonly edible marine animals.

2. Description of the Prior Art

The conventional method of transporting fish, i.e., general fish, shellfish such as crab, lobster, etc., mollusks such as trepang, cuttlefish, octopi, etc., and sea urchin and the like is to put them into a live-fish tank. This, however, requires a large amount of water to be put into the fish tank so that the fish may freely swim or move, and therefore, poses a problem in that the weight thereof is heavy, the transporting cost is high, and large quantities of fish cannot be transported with a single live-fish tank. Further, there is a problem in removing fish from the tank, in that scooping out the desired fish from among the many in the tank is a time-consuming process.

In the past, an alternate method for transporting fish 1 has been proposed, which comprises, as shown in FIG. 1, putting a vinyl bag 8 into a cardboard box 25 or the containers, putting fish 1, and an aqueous solution with an oxygen generating agent 23 into the vinyl bag 8, and tying the mouth portion of the vinyl bag 8 with a rubber band 24 so that the vinyl bag 8 is sealed.

However, in the conventional system shown in FIG. 1, the interior of the vinyl bag 8 cannot be completely sealed, and oxygen cannot be supplied unless the oxygen generating agent 23 is used. This results in the inconvenience that the fish can be transported only for a given limited period of time while maintaining them in a live state. Another problem is that the fish 1 move around within the vinyl bag 8, a consequence of which is an increased amount of oxygen consumed so large that the oxygen generated by the oxygen generating agent 23 is consumed in a short period of time. The live transportation over a long period of time cannot be achieved. There is an additional problem where the fish 1 thrash about wildly, resulting in damage or scratches the surface of the fish, lowering their value.

An object of the present invention is to provide a method which can transport live fish over a long period of time with less damage.

SUMMARY OF THE INVENTION

The present invention provides a method for immobilizing fish, comprising: the provision of one electrode on the head portion of the fish or shellfish, and another electrode on the tail portion of said fish or shellfish, allowing a current to flow between said electrodes to put the fish or shellfish in an anesthetized condition, after which the spinal cord of the fish or shellfish is cut to immobilize them.

In the above-described method, the positive pole of a DC power supply is connected to an electrode at the head portion of fish while the negative pole is connected to an electrode at tail portion, through which a DC current is allowed to flow.

An implement for immobilizing fish comprises a pair of electrodes made from an insulting water-resistant sheet formed with an exit for fish in one or two directions, and a pair of electrodes formed from conductive sheets made of carbon fibers or aluminum foil or other material internally of both sides of said water-resistant sheet.

Further, a bag for transporting fish is constructed so that at the upper portion of a bag formed of a water resistant and thermally fused material, integral with said material, is a web-like pouring tube for liquid and air or oxygen, and an opening to insert fish is formed at the side of the bag.

Only the fish are inserted through the fish insertion opening, of the bag for transporting fish, the insertion opening is thermally fused, and subsequently water or sea water with air or oxygen is poured through the pouring tube, after which the extreme end of the pouring tube is thermally fused to seal the interior of the bag, in which state fish are transported.

DESCRIPTION OF THE PREFERRED EMBODIMENT

The embodiment of the present invention will be described hereinbelow with reference to the drawings.

Figure 1:
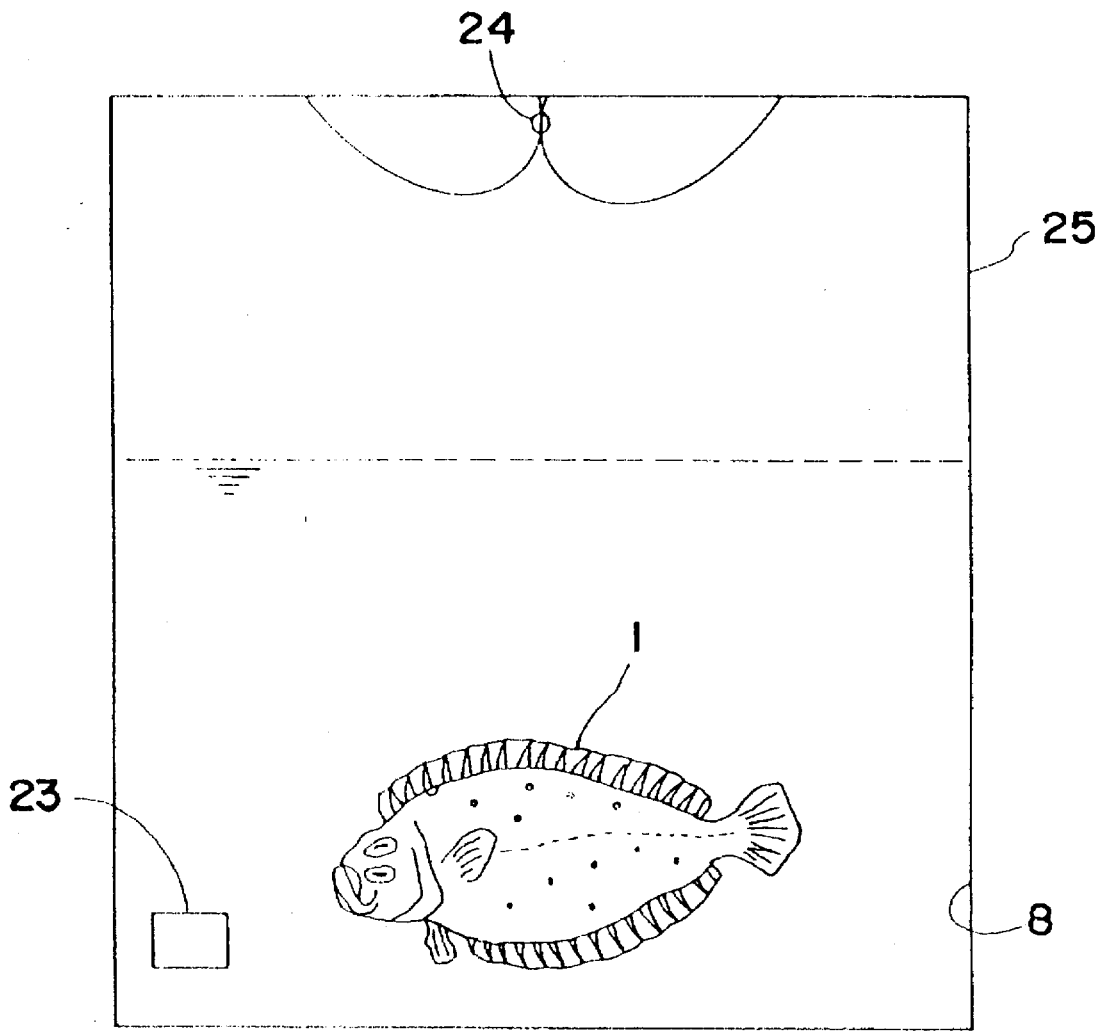
FIG. 1 is a longitudinal sectional view showing the construction of a conventional transporting container.
Figure 2:
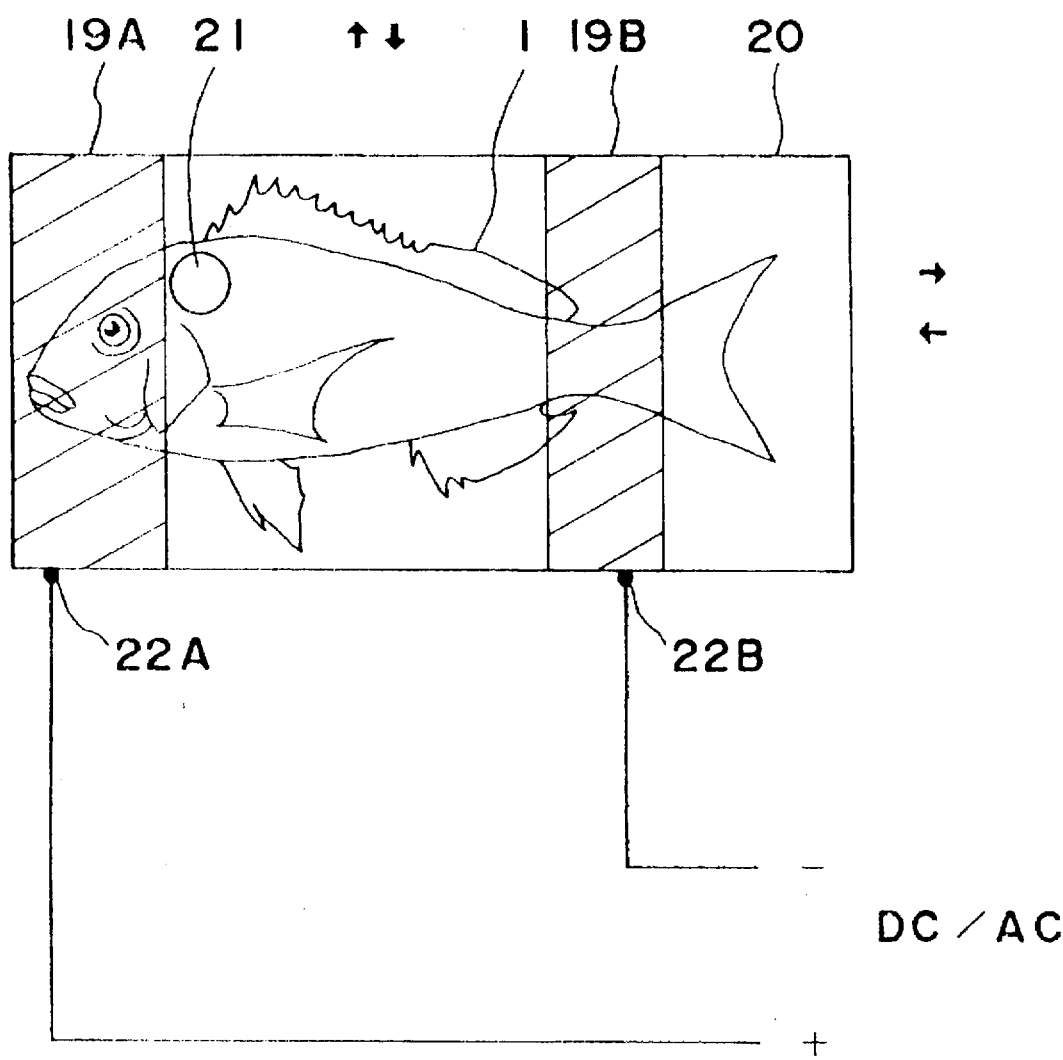
FIGS. 2 and 3 are, respectively, plan views showing the implement for immobilizing fish according to the present invention.
Figure 3:
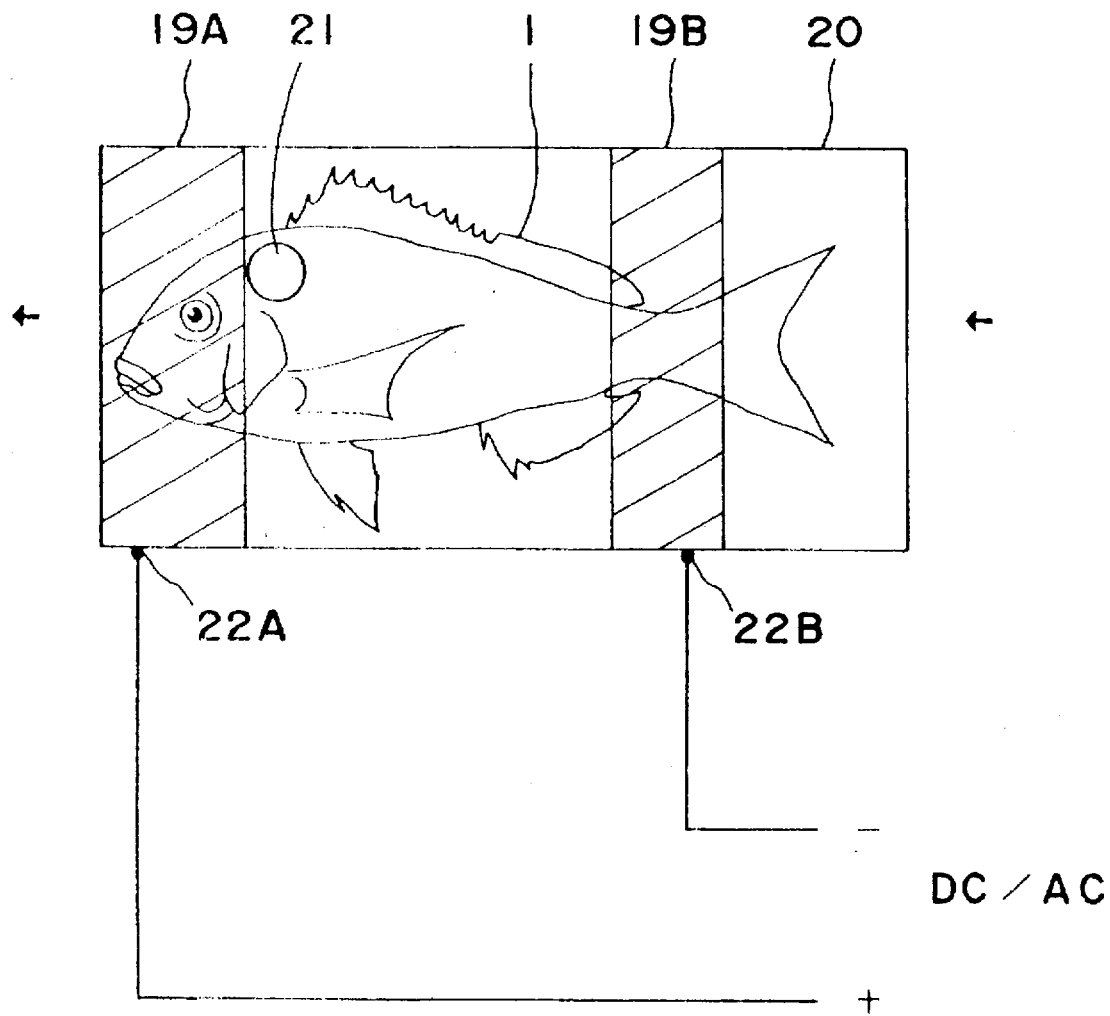

FIGS. 2 and 3 are, respectively, front views showing the implement for immobilizing fish. In the figures, reference numerals 19A and 19B designate electrodes formed of carbon fibers or metal foils, 20 designates a bag which is formed of polyvinyl chloride or other chemical materials and which is open in one direction or two directions, 21 designates a hole into which an implement is inserted to cut the spinal cord of fish 1, and 22A and 22B designate terminals for applying voltage to the electrodes 19A and 19B.

FIG. 2 shows an embodiment of an implement for immobilizing fish in which the electrodes 19A and 19B are mounted internally in the bag 20 formed with exits upwardly and rightwardly as indicated by the arrow. Fish are put into the bag 20. DC voltage is applied to the terminals 22A and 22B to allow a current to flow into the body of fish 1 through the electrodes 19A and 19B so that the fish are anesthetized.

The electrodes 19A and 19B have a width of 4 to 5 cm, the front portion of the fish body being an anode and the rear portion thereof being a cathode. The magnitude of voltage to be applied varies according to the kind and size of the fish. In the case of a standard yellowtail, the voltage would be 3 V, and in the case of a red sea bream, the voltage would be 4.5 V, at which the fish become instantaneously immobilized. The fish can be maintained in their immobilized state for the roughly one minute required for the operation. When voltage polarities are reversed, the fish will stop breathing. If AC current is applied, the fish will become immobilized at 0.7 to 1.3 V. However, it is more convenient to use DC voltage, which can be driven by a battery, in consideration of the working environment.

In the anesthetized condition at which fish become immobilized, the spinal cord of the fish is cut, using a saw, an electric drill or other implements for the operation, through the portion of the hole 21 formed in the bag 20, to immobilize the bodies of the fish 1. The spinal cords are to be cut at the third to fourth bones, and a portion corresponding thereto is formed with the hole 21. When the fish are returned to the water after cutting the spinal cord, the fish start breathing immediately and rarely bleed. The amount of oxygen consumed by a yellowtail in which the spinal cord is cut rarely increases, even if the fish is given a stimulus.

FIG. 3 shows an example in which exits for fish are provided on the left and right sides of the bag 20 as indicated by the arrows.

Figure 4:
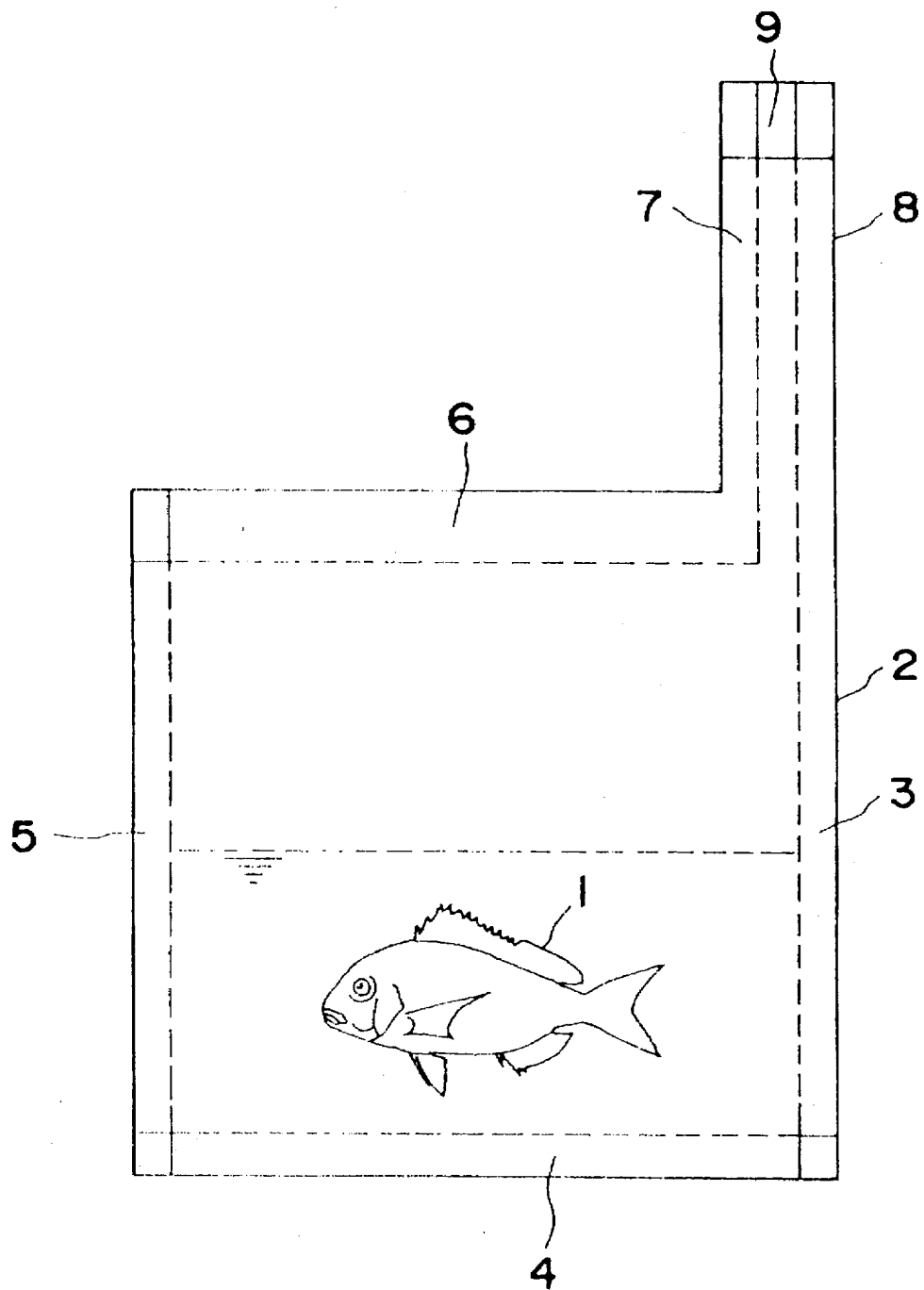
FIG. 4 is a front view showing a bag for transporting fish according to the present invention.

The container used for the transportation of fish thus immobilized will be described below. FIG. 4 is an explanatory view of the principle of a transporting container according to the present invention. In the figure, reference numeral 1 designates fish, 2 designates a bag (hereinafter referred to as a receiving bag) formed from a film in which nylon and polyethylene or the like, which is more resistant to glass penetrability, are laminated in three or five layers or formed from other chemical products, 3 and 5 designate a turn-up portion or a thermally fused portion, 4, 6, 7 and 9 designate thermally fused portions, and 8 designates a pouring tube.

The present embodiment is intended for fish and an aqueous solution (water or sea water) with oxygen to be put into the receiving bag 2, and the receiving bag 2 to be sealed. However, direct heat fusion of the mouth portion of the receiving bag 2 using a heat source such as high frequency electricity involves the following problem. That is, since the power supply which generates the high frequency or the like is high in voltage, if the aqueous solution leaks from the receiving bag 2 or the receiving bag 2 is broken, the operator may receive an electric shock. In consideration of this, it would be too dangerous for the mouth portion of the receiving bag 2 to be directly thermally fused using high frequency or other heat sources. In the state where the aqueous solution is in the receiving bag 2, it is not possible to directly thermally fuse the mouth portion of the receiving bag 2 using high frequency or other heat sources. Further, it cannot be sealed in the state where pressure is applied to the receiving bag 2.

Figure 5:
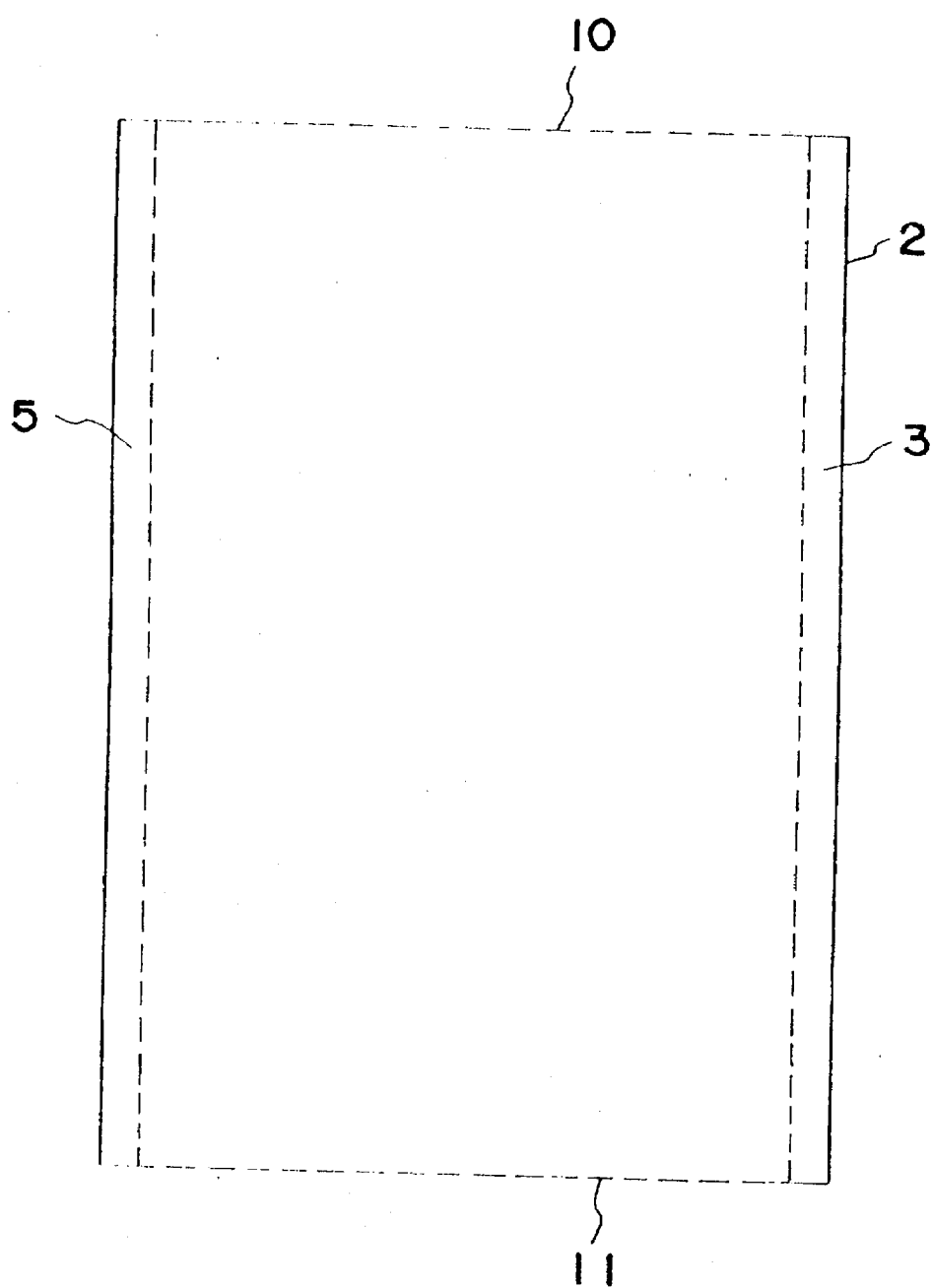
FIGS. 5 and 6 are, respectively, front views showing the steps of manufacturing the bag for transporting fish according to the present invention.
Figure 6:
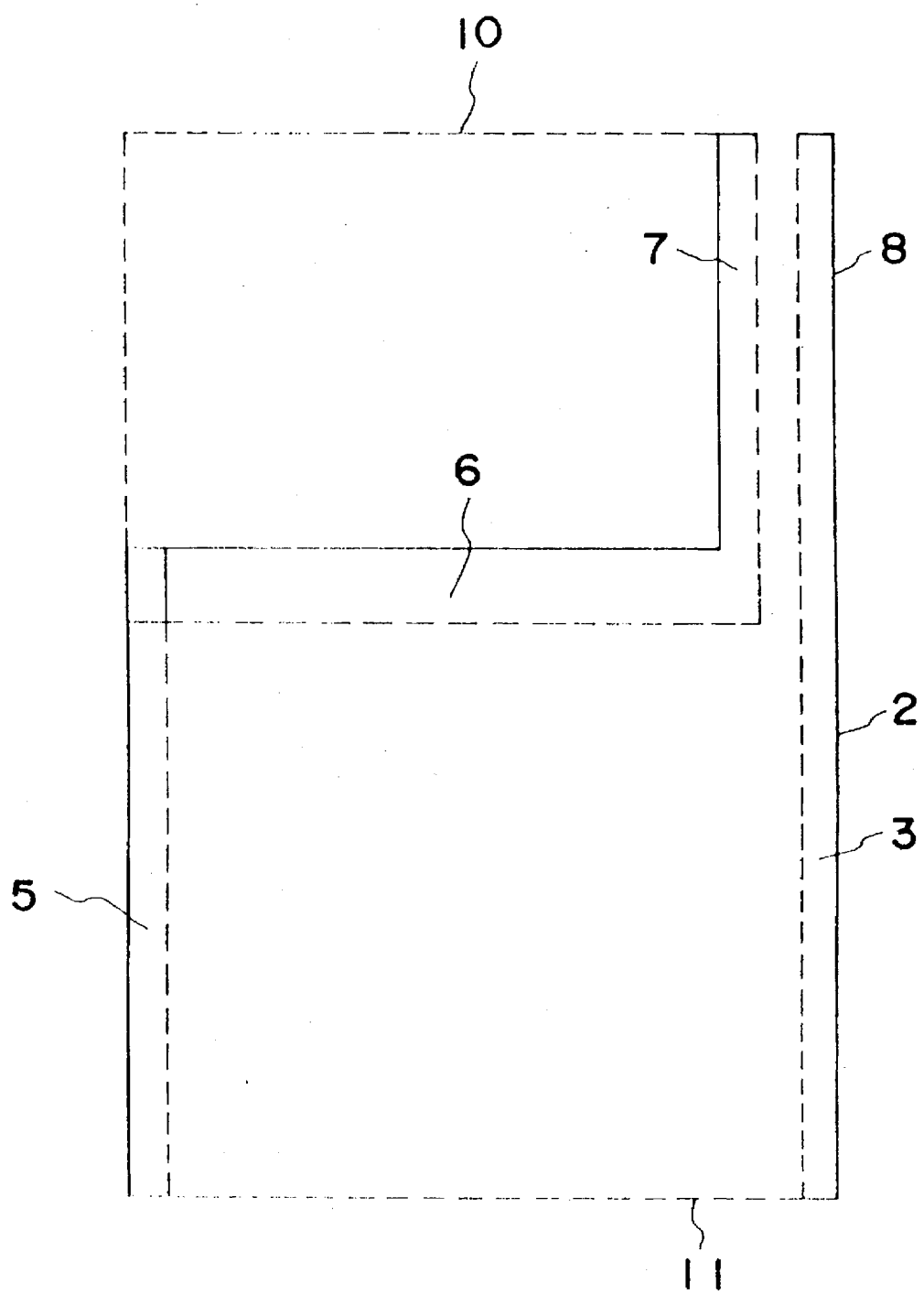

The above-described problem can be solved by the provision of an arrangement wherein one end 10 of both ends 10 and 11 of a receiving bag 2 having a cylindrical shape or other shapes as shown in FIG. 5 is processed, thereby forming a pouring tube 8 having a smaller diameter than that of the end 10 of the receiving bag 2, thus providing a receiving bag 2 as shown in FIG. 6.

Figure 7:
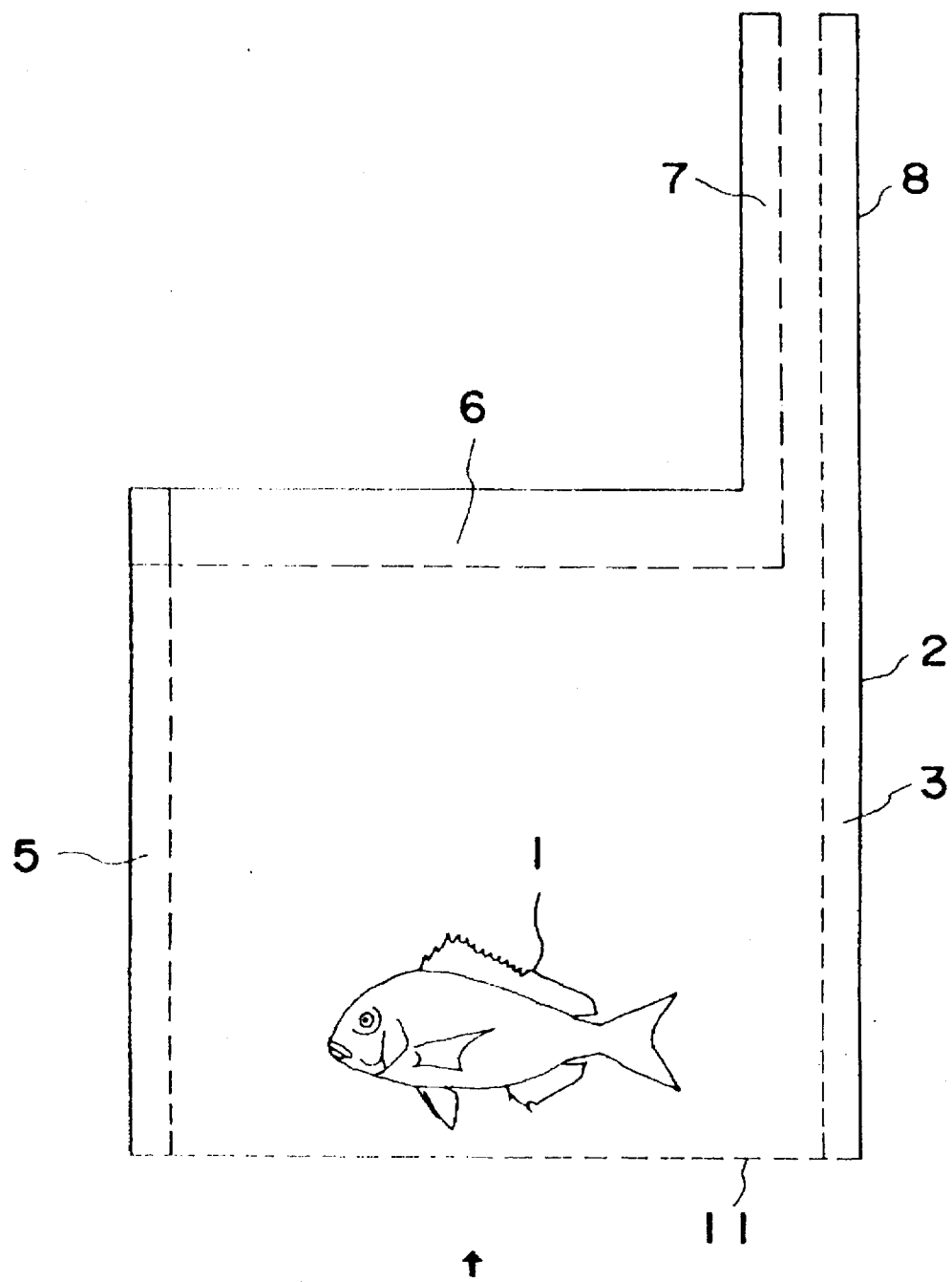
FIGS. 7 to 10 are, respectively, front views showing the steps of putting and sealing fish into the bag for transporting them according to the present invention.
Figure 8:
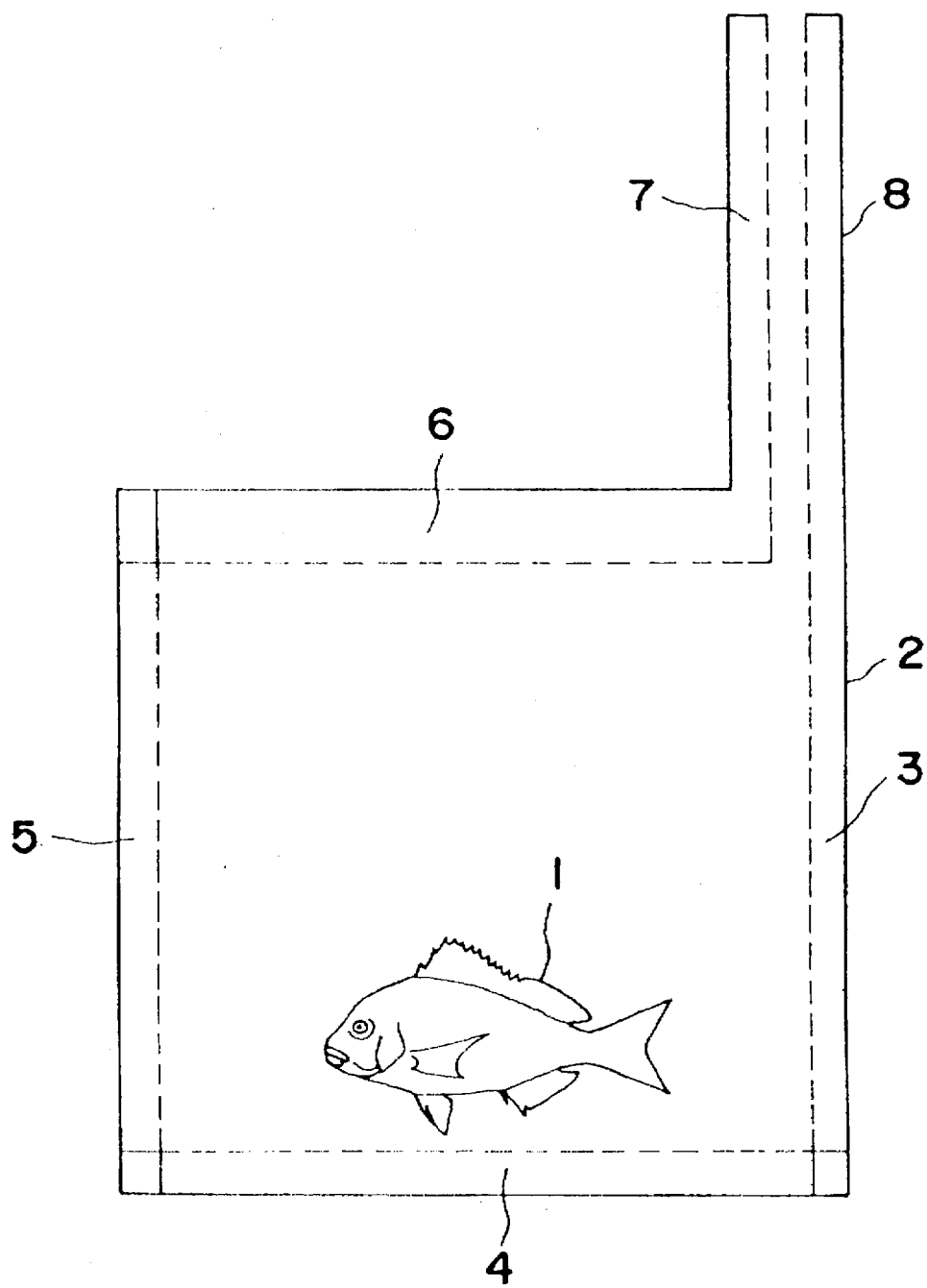
Figure 9:
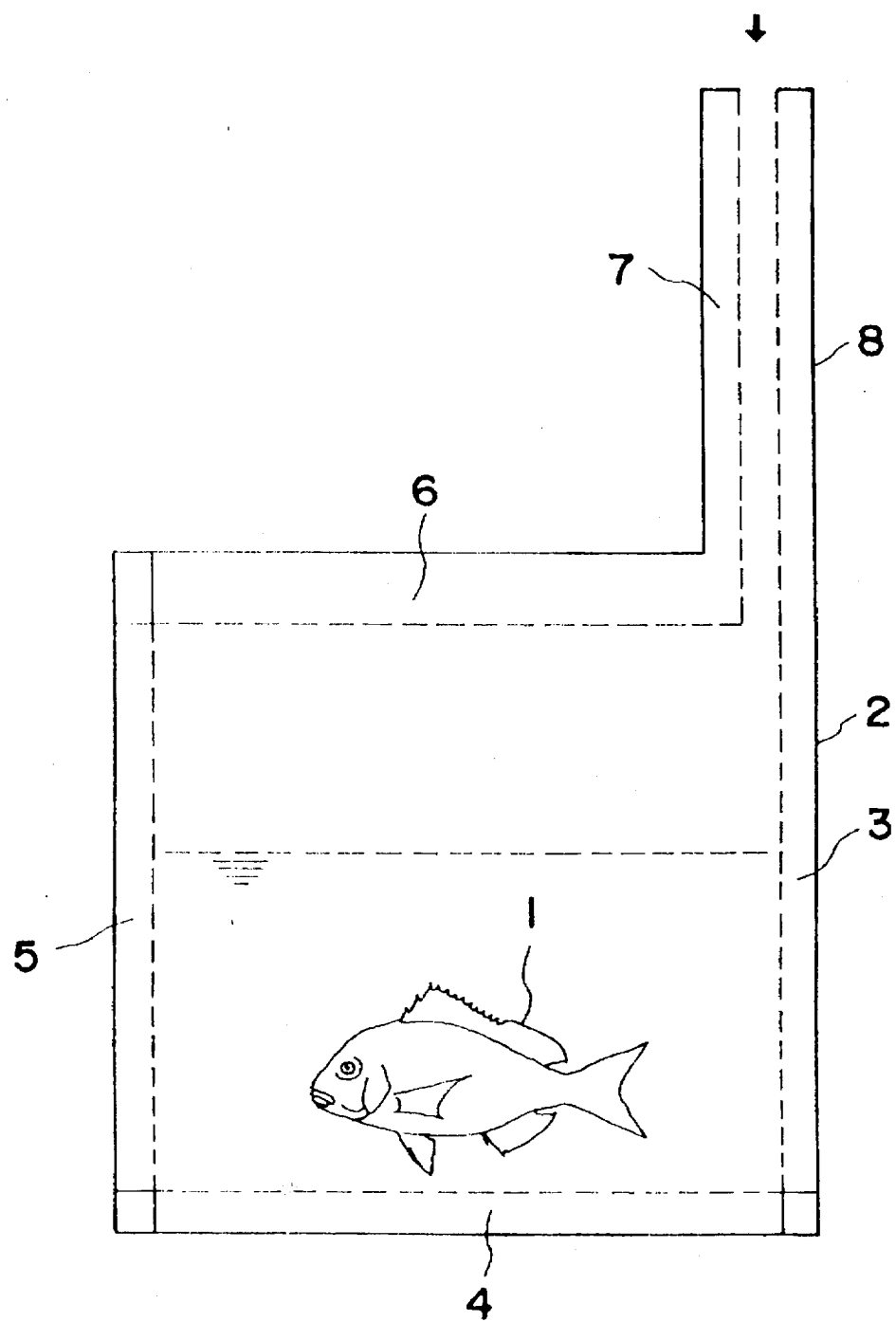
Figure 10:
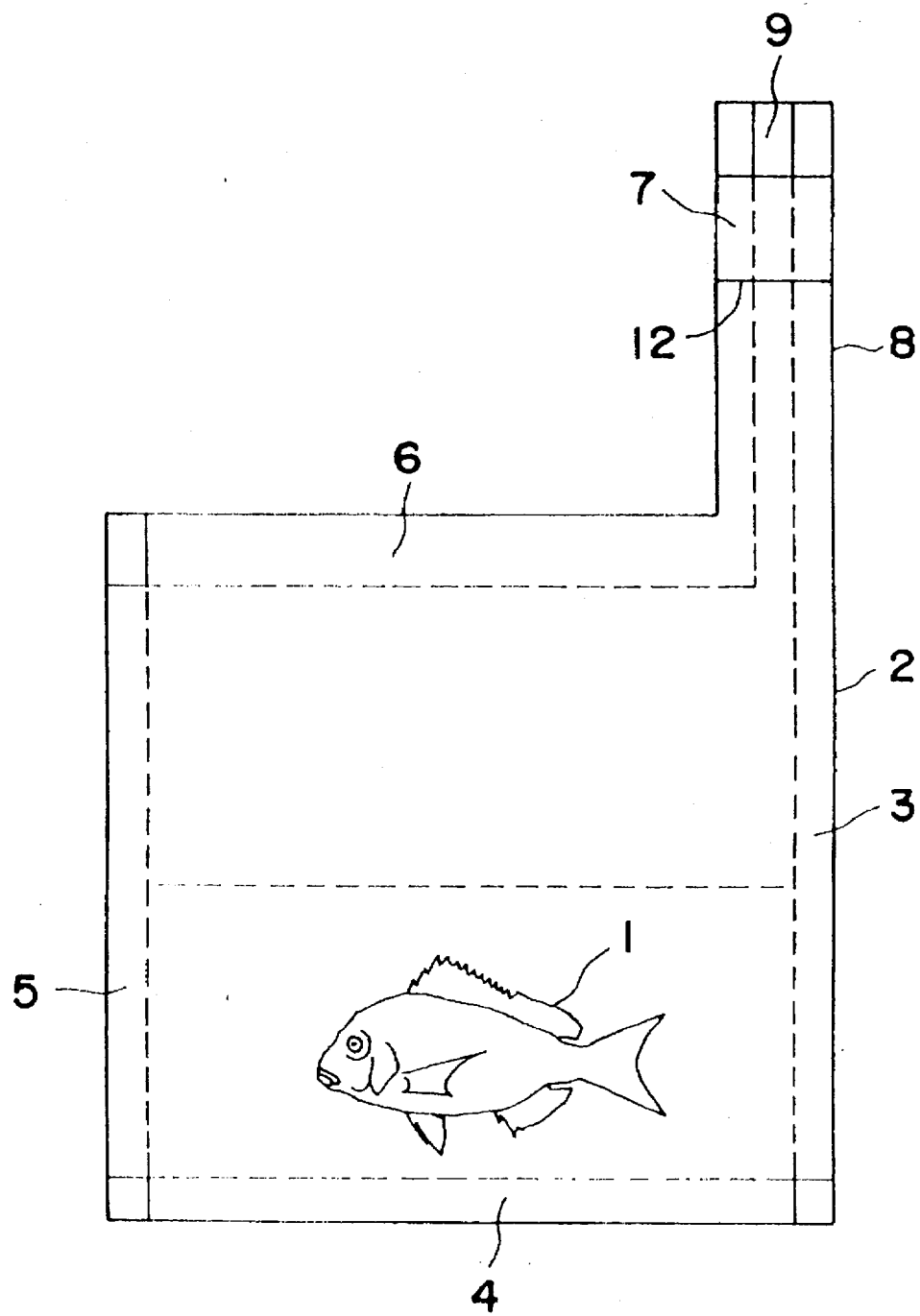
Figure 11:
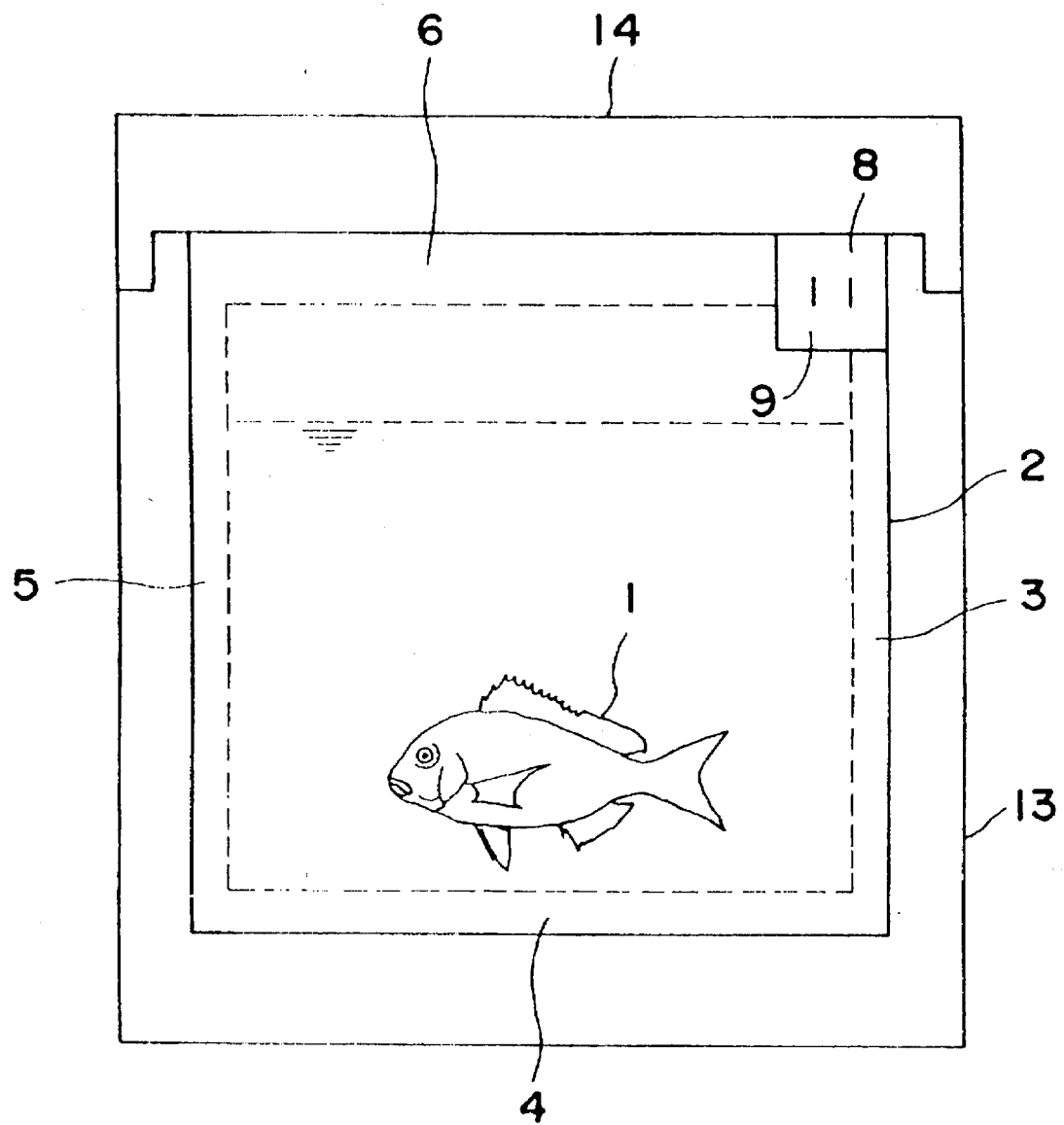
FIG. 11 is a sectional view showing the state where fish are put into the transporting container.

Through the opening of the opposite end 11 of the receiving bag 2, prepared in such a manner that the one end 10 of the receiving bag 2 is processed to form the pouring tube 8 having a smaller diameter than that of the one end 10 of the receiving bag as shown in FIG. 6, fish, or fish and aqueous solution, are inserted as shown in FIG. 7. The opening portion of the one end 11 of the receiving bag 2 is thermally fused to form a thermally fused portion 4 as shown in FIG. 8. The aqueous solution and oxygen are poured in through the opening portion of the pouring tube 8 as shown in FIG. 9. The aqueous solution and oxygen within the receiving bag 2 are temporarily prevented from leaking out of the opening portion of the pouring tube 8, by using a rubber band 12 or other means. Subsequently, the extreme end of the pouring tube 8 is thermally fused using high frequency or other heat sources to form a thermally fused portion 9 as shown in FIG. 10. With this, for example, even if the thermally fused portion 9 is broken during the fusing operation, the aqueous solution within the receiving bag 2 will not leak from said thermally fused portion 9, thus being free from danger. The interior of the receiving bag 2 can be made in a sealed state. FIG. 11 is a sectional view showing the state where the portion of the pouring tube 8 of the receiving bag 2 into which fish are put is folded, which is put into a container 13 made of expanded styrol. Container 13 is then placed in the cover 14.

FIGS. 12 to 15 show another example of a transporting bag according to the present invention, in which case a second pouring tube 17 is further provided other than the pouring tube 8 in the bag of the aforementioned embodiment.

Figure 12:
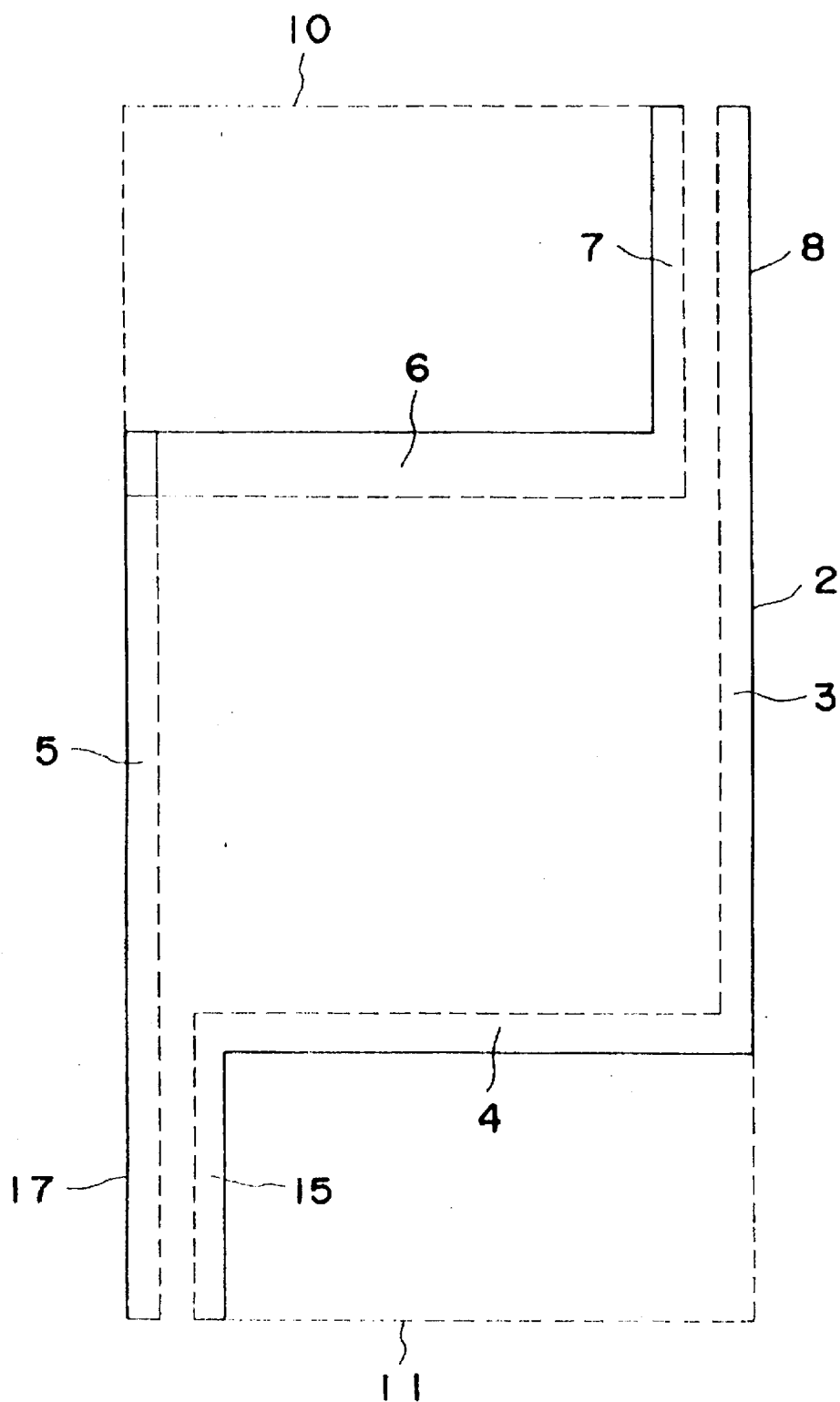
FIG. 12 is a front view showing another example of the bag for transporting fish according to the present invention.

FIG. 12 shows a receiving bag 2 prepared in such a manner that both ends 10 and 11 of the receiving bag 2 are processed, and a pouring tube 8 and a second pouring tube 17 are formed on both ends 10 and 11 of the receiving bag 2.

Figure 13:
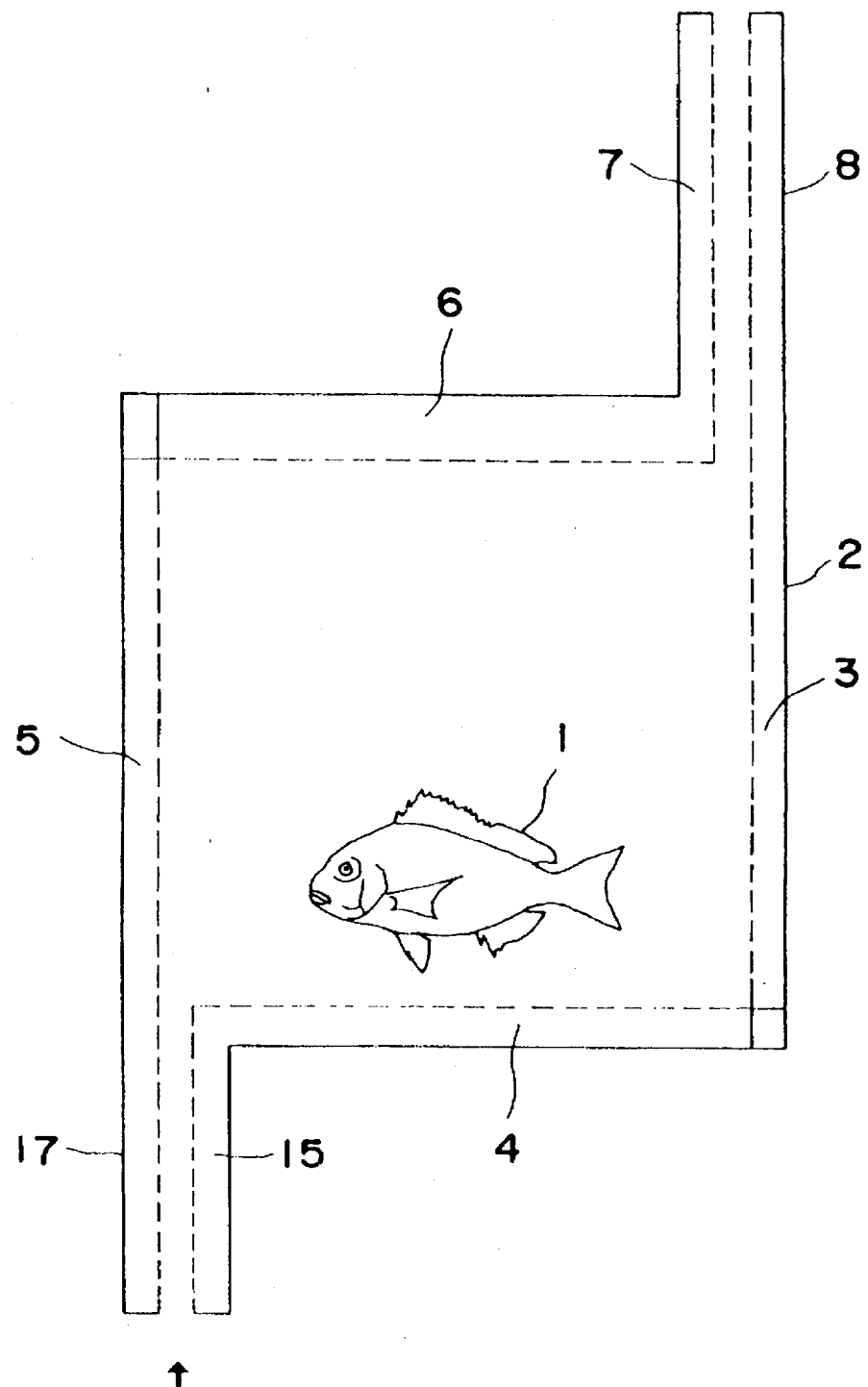
FIGS. 13 to 15 are respectively front views showing the steps of putting and sealing fish into the bag shown in FIG. 12.

FIG. 13 shows the state where fish are put through the second pouring tube 17 formed by processing one end 11 of the receiving bag 2.

Figure 14:
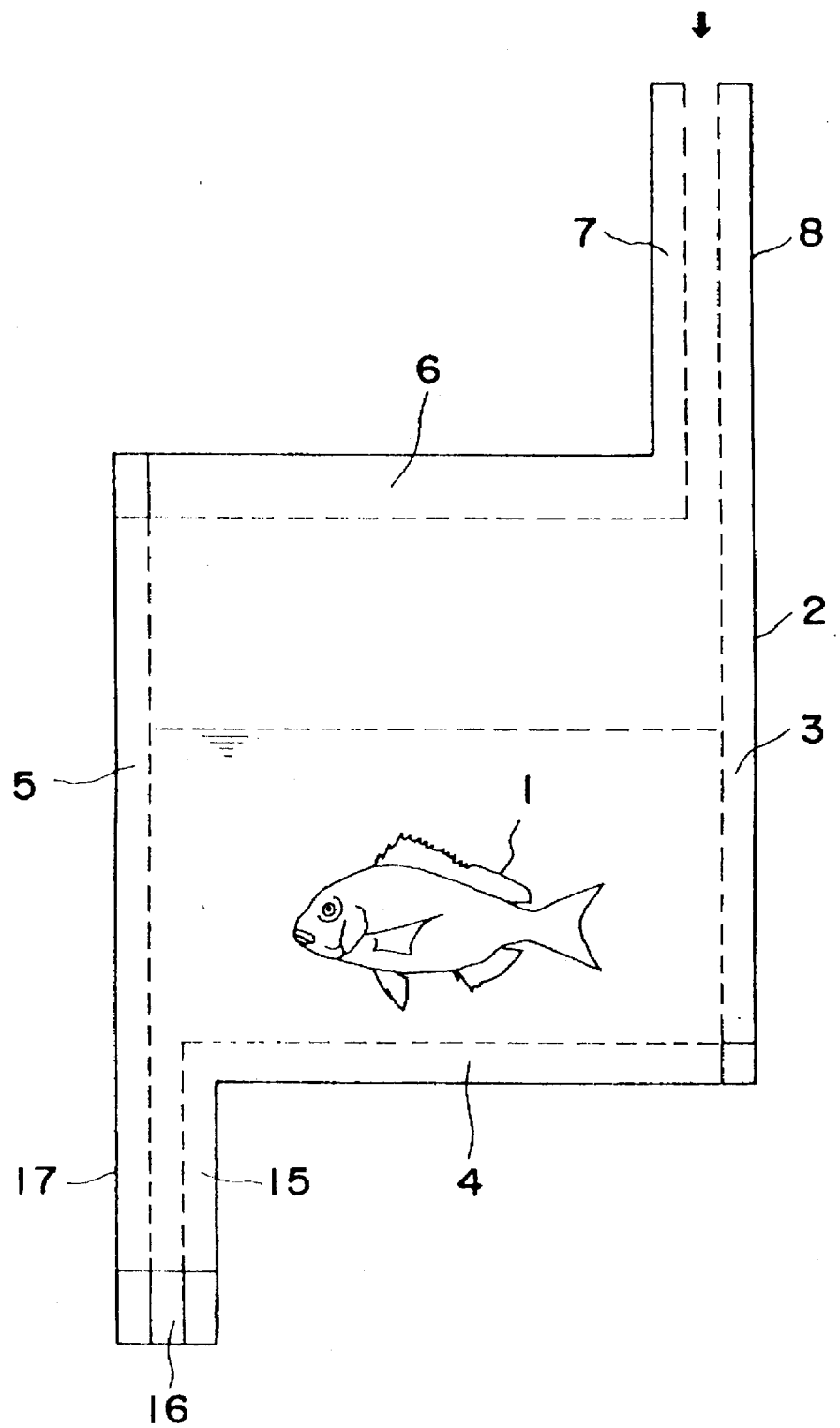

FIG. 14 shows the state where the extreme end of the second pouring tube 17 is thermally fused to form a thermally-fused portion 16 and sealed, and after this the aqueous solution, oxygen and the like are poured through the pouring tube 8 formed by processing one end 10 of the receiving bag 2.

Figure 15:
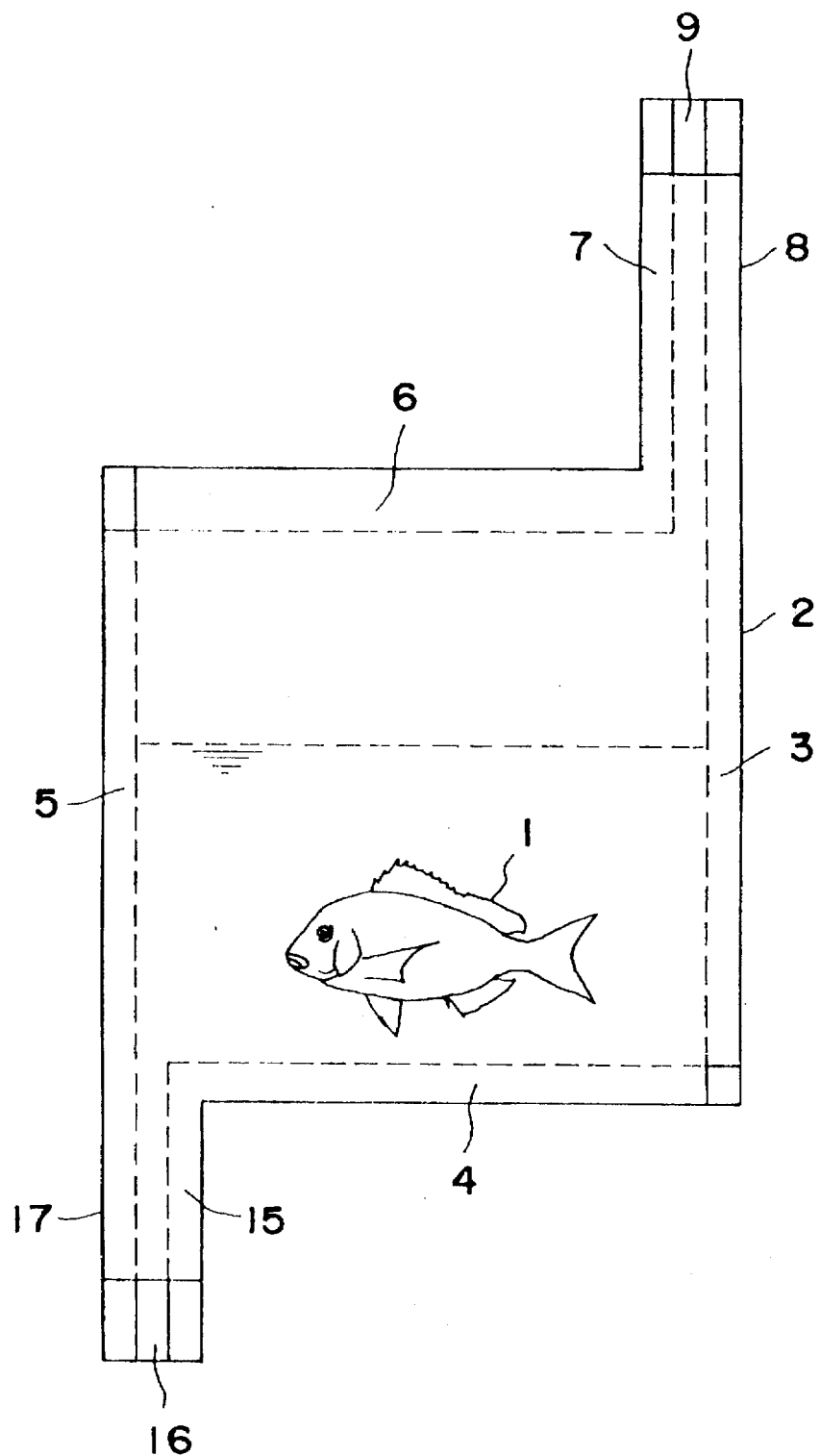

FIG. 15 shows the state where the extreme end of the pouring tube 8 is thermally fused to form and seal the thermally-fused portion 9, to render the interior of the receiving bag 2 in a sealed state.

Figure 16:
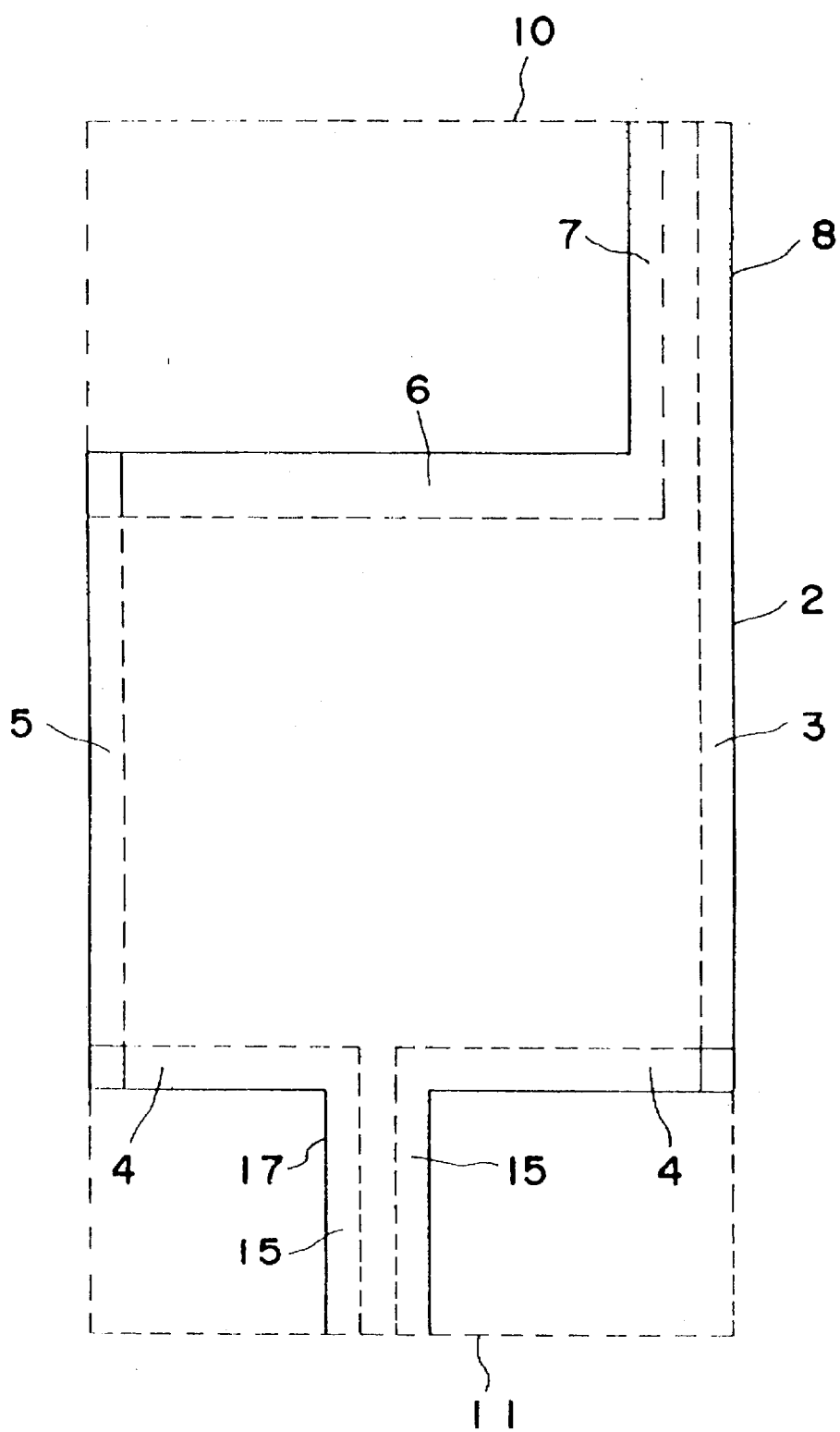
FIG. 16 is a front view showing a further example of a bag for transporting fish.

Alternatively, as shown in FIG. 16, the second pouring tube 17 is formed in the central portion of the lower portion of the receiving bag 2 to facilitate the introduction of fish therein.

When the fish 1 are transported using the receiving bag 2, which can be placed in a completely sealed condition in the manner described above, the concentration of carbon dioxide excreted by the breathing action of the fish 1 with the passage of time increases in the aqueous solution so that pH in the aqueous solution within the receiving bag 2 containing the fish 1 therein is more or less than 3. The concentration of ammonia increases in the aqueous solution due to urea or the like simultaneously excreted by the fish 1. However, ammonia in the aqueous solution assumes a dissociated state due to the lowering of pH in the aqueous solution by carbon dioxide, and the toxicity of the ammonia in itself greatly decreases. (This happens when ammonia almost assumes the dissociation state, when pH is 6.5 or less, to lower the toxicity).

As described above, according to the present invention, if fish are transported using the receiving bag provided with the pouring tube formed by processing one end of the opening portion of the receiving tube, the internal pressure of the receiving bag can be made constant and the interior of the receiving bag can be placed in a completely sealed state. Therefore, gasses having a high oxygen concentration can be retained for a long period of time by pouring pure oxygen. Oxygen can be sufficiently replenished and retained without use of an oxygen generating agent. Furthermore, by dissolving until the carbon dioxide excreted by fish assuming a saturated state as time passes, the following effects are produced.

(1) Since pH in the aqueous solution very slowly decreases to about 6 as time passes, the ammonia excreted by fish assumes a dissociated state so that the toxicity of the ammonia becomes less.

(2) Since the concentration of carbon dioxide in the aqueous solution very gently increases as time passes so that the concentration of carbon dioxide in the aqueous solution assumes a dissociated state, fish can be placed, in a natural manner, in the provided state and given ideal anesthesia. The fish can be placed in a state similar to hibernation.

In s case where lobsters or the like are transported by air, they and wooden pieces or shavings are put, via one end of a separate opening, into the receiving bag provided with the pouring tube formed by processing one end of the opening portion of the receiving bag. The receiving bag is then sealed, and air present in the receiving bag is discharged, after which oxygen is poured through the pouring tube into the receiving bag. The extreme end of the pouring tube provided on the receiving bag is sealed by use of a rubber band or other means, whereby the interior of the receiving bag can be maintained in a state where the concentration of oxygen is very close to 100%. Therefore, when transportation by air or the like, in which oxygen is rare, is utilized, lobsters or the like can be transported efficiently.

INDUSTRIAL APPLICABILITY

The present invention can be utilized by fishery and circulation fields for transporting caught or cultivated fish in a live state to markets, restaurants, consumers and the like.

I claim:

1. A method for transporting fish comprising forming a fish transporting bag having a main portion having a fish insertion opening and an elongated passage opening up into said main portion, providing said elongated passage with a fluid-receiving end and a joined end integrally joined to said main portion, inserting fish through said fish insertion opening into said main portion, thermally sealing said fish insertion opening, introducing life-support fluid into said fluid-receiving end of said elongated passage, passing said life-supporting fluid through said elongated passage into said main portion, and thermally sealing said fluid-receiving end of said elongated passage.

2. A method according to claim 1 further comprising providing said main body portion of said fish transporting bag with a top and a bottom, disposing said fish insertion opening at said bottom of said main body, and disposing said elongated passage at said top of said main body.

3. A method according to claim 1 further comprising effecting said thermal sealing utilizing an electric power supply.

4. A method according to claim 1 further comprising effecting said thermal sealing utilizing high frequency electricity.

5. A method according to claim 1 further comprising forming a second elongated passage opening up into said main portion of said fish transporting bag, said second elongated passage constituting said fish insertion opening, said step of inserting fish through said fish insertion opening into said main body of said fish transporting bag comprising inserting said fish into said second elongated passage and passing said inserted fish through said second elongated passage into said main portion of said fish transporting bag.

6. A method according to claim 5 further comprising providing said main portion of said fish transporting bag with a top and a bottom, disposing the first said elongated passage for opening up into said top of said main portion of said fish transporting bag, and disposing said second elongated passage for opening up into said bottom of said main portion of said fish transporting bag.

7. A method according to claim 1 further comprising temporarily closing off said elongated passage after said life-supporting fluid has passed through said elongated passage into said main body and prior to thermally sealing the fluid receiving end of said elongated passage.

8. A method according to claim 7 where said step of temporarily closing off said elongated passage comprises closing off said elongated passage at a position spaced from said fluid receiving end of said elongated passage.

9. A method according to claim 1 further comprising folding said thermally sealed elongated passage and positioning said folded thermally sealed elongated passage juxtaposed to said main portion of said fish transporting bag.

10. A method according to claim 9 further comprising placing said fish transporting bag with said folded thermally sealed elongated passage juxtaposed to said main portions within a container.

11. A bag for transporting fish comprising a main body for holding fish and life-supporting fluid and an elongated passage extending from said main body portion, said main body portion and said elongated passage being integrally formed with a thermally fusible material, said elongated passage having a terminating end and a connecting end integrally joined to said main body portion, a first thermal seal sealing said main body portion, said first thermal seal being provided after said fish has been introduced into said main body portion, and a second thermal seal sealing said terminating end of said elongated passage, said second thermal seal being provided after said life-supporting fluid has been introduced into said main body portion via said elongated passage.

12. A bag for transporting fish according to claim 11 wherein said main portion of said fish transport bag has a top and a bottom, said first thermal seal being disposed at said bottom of said main portion.

13. A bag for transporting fish according to claim 11 wherein said elongated passage has an elongate axis, said main body having a longitudinal axis parallel to said elongate axis, the cross-sectional area of said elongate passage perpendicular to said elongate axis being less than the cross sectional area of said main body perpendicular to said longitudinal axis.

14. A bag for transporting fish comprising a main body for holding fish and life-supporting fluid, said main body having a top and a bottom, a first elongated passage extending from said bottom of said main body, said first elongated passage and said main body being integrally formed with a thermally fusible material, said first elongated passage having a terminating end and a joined end integrally joined to said bottom of said main body, a first thermal seal sealing said first elongated passage, said first thermal seal being provided after said fish has been introduced into said main body through said first elongated passage, a second elongated passage extending from said top of said main body, said second elongated passage and said main body being integrally formed with a thermally fusible material, said second elongated passage having a terminating end and a joined end integrally joined to said main body, a second thermal seal sealing said second elongated passage, said second thermal seal being provided after said life-supporting fluid has been introduced into said main body through said second elongated passage.

15. A bag for transporting fish according to claim 14 wherein said first elongated passage has an elongate axis, said main body having a longitudinal axis parallel to said elongate axis, the cross-sectional area of said first elongate passage perpendicular to said elongate axis being less than the cross-sectional area of said main body perpendicular to said longitudinal axis.

16. A bag for transporting fish according to claim 14 wherein said second elongated passage has an elongate axis, said main body having a longitudinal axis parallel to said elongate axis, the cross-sectional area of said second elongate passage perpendicular to said elongate axis being less than the cross sectional area of said main body perpendicular to said longitudinal axis.

* * * * *